United States Patent
Nino et al.

(10) Patent No.: US 7,093,014 B2
(45) Date of Patent: Aug. 15, 2006

(54) ACCESS METHOD AND SYSTEM WITH RESTRICTED NUMBER OF ADDRESS INDENTIFIERS IN DOMAIN AREAS FOR IDENTIFYING SERVER ADDRESSES

(75) Inventors: Yuichi Nino, Tokyo (JP); Itaru Hosomi, Tokyo (JP)

(73) Assignee: NEC Corporation, Tokyo (JP)

( * ) Notice: Subject to any disclaimer, the term of this patent is extended or adjusted under 35 U.S.C. 154(b) by 765 days.

(21) Appl. No.: 09/945,752

(22) Filed: Sep. 5, 2001

(65) Prior Publication Data
US 2002/0027568 A1   Mar. 7, 2002

(30) Foreign Application Priority Data
Sep. 6, 2000  (JP) ............................ 2000-269707

(51) Int. Cl.
*G06F 13/00* (2006.01)
(52) U.S. Cl. ........................ 709/225; 709/219; 709/226
(58) Field of Classification Search ................ 709/217, 709/219, 223, 225, 226, 249, 250
See application file for complete search history.

(56) References Cited

U.S. PATENT DOCUMENTS

| 6,014,090 | A  | * | 1/2000 | Rosen et al. ................. 340/905 |
| 6,047,327 | A  | * | 4/2000 | Tso et al. ..................... 709/232 |
| 6,154,777 | A  | * | 11/2000 | Ebrahim ....................... 709/227 |
| 6,202,023 | B1 | * | 3/2001 | Hancock et al. ............. 701/201 |
| 6,256,498 | B1 | * | 7/2001 | Ludwig ........................ 455/433 |
| 6,292,833 | B1 | * | 9/2001 | Liao et al. .................... 709/229 |
| 6,356,761 | B1 | * | 3/2002 | Huttunen et al. ........ 455/456.1 |
| 6,412,014 | B1 | * | 6/2002 | Ryan ............................ 709/245 |
| 6,442,602 | B1 | * | 8/2002 | Choudhry .................... 709/218 |
| 6,560,640 | B1 |   | 5/2003 | Smethers |
| 6,629,642 | B1 | * | 10/2003 | Swartz et al. ........... 235/462.46 |
| 6,650,877 | B1 | * | 11/2003 | Tarbouriech et al. .... 455/186.1 |
| 6,654,813 | B1 | * | 11/2003 | Black et al. ................. 709/245 |
| 6,665,715 | B1 | * | 12/2003 | Houri .......................... 709/223 |
| 6,757,740 | B1 | * | 6/2004 | Parekh et al. ............... 709/245 |
| 2001/0047395 | A1 | * | 11/2001 | Szutu ......................... 709/217 |

FOREIGN PATENT DOCUMENTS

| JP | 10-78928    | 3/1998 |
| JP | 2000-215208 | 8/2000 |
| JP | 2000-236349 | 8/2000 |
| WO | WO 00/00908 | 1/2000 |

* cited by examiner

*Primary Examiner*—Viet D. Vu
(74) *Attorney, Agent, or Firm*—Foley & Lardner LLP

(57) ABSTRACT

A website access system allowing easy operation and a small number of steps for accessing a desired one of a great number of websites is disclosed. A plurality of domain areas are provided, which is determined so that a number of information providers is restricted. An address registration database retrievably registers a plurality of address identifiers uniquely identifying respective ones of website addresses which have been registered for each of the domain areas. An access management server receives an address identifier from the user terminal located in one of the domain areas, searches the address registration database for a corresponding website address according to the address identifier and the domain area where the user terminal is located, and then uses the corresponding website address to make the user terminal access the desired website on the network.

40 Claims, 14 Drawing Sheets

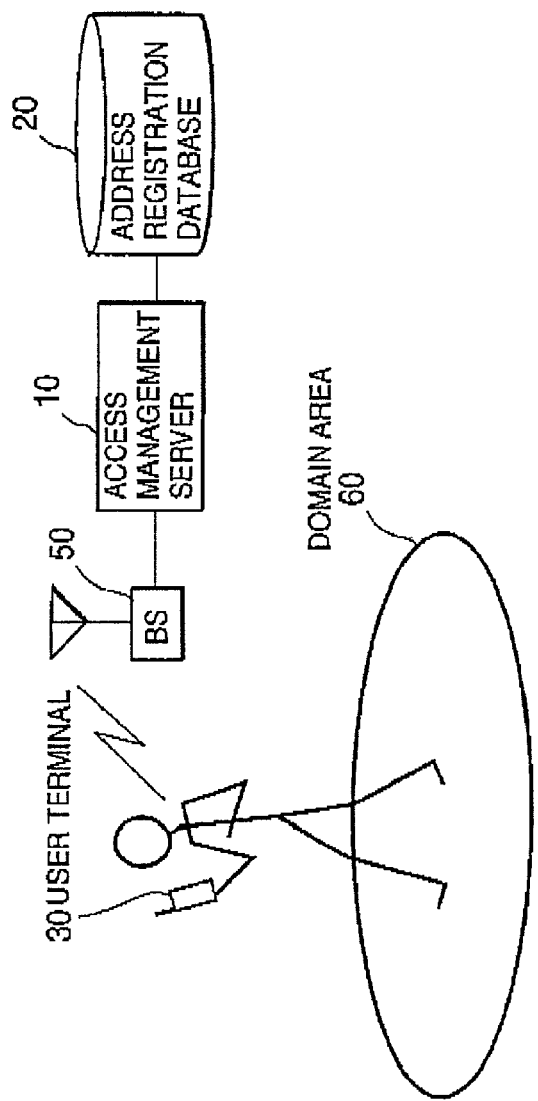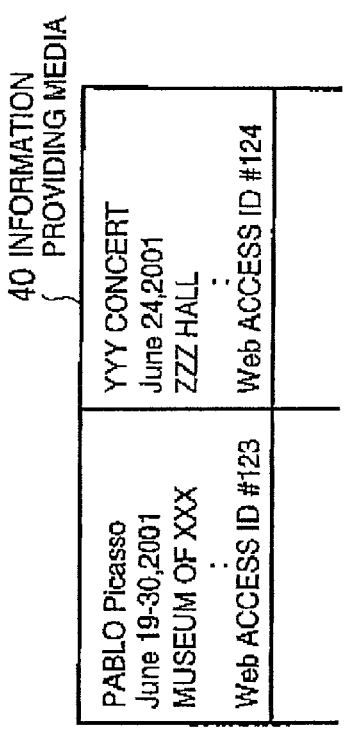

ADDRESS REGISTRATION DB

| Web ACCESS ID | URL |
|---|---|
| 1 | http://www.a.com/a/ |
| 2 | http://www.a.com/b/ |
| ⋮ | ⋮ |
| 122 | http://www.x.com/x/ |
| 123 | http://www.x.com/y/ |
| 124 | http://www.x.com/z/ |
| ⋮ | ⋮ |

FIG.14

CARRIER A

| DOMAIN AREA ID | ADJACENT DOMAIN AREA ID |
|---|---|
| 1 | B.10,··,C.100,·· |
| 2 | B.11,··,C.103,·· |
| ⋮ | ⋮ |
| m1 | B.n1,B.n2,B.n3,C ··· |
| ⋮ | ⋮ |

CARRIER B

| DOMAIN AREA ID | ADJACENT DOMAIN AREA ID |
|---|---|
| 1 | A.20,··,C.200,·· |
| 2 | A.21,··,C.203,·· |
| ⋮ | ⋮ |
| n1 | ··,A.m1 ··· |
| n2 | ··,A.m1 ··· |
| n3 | ··,A.m1 ··· |
| ⋮ | ⋮ |

···

ACCESS METHOD AND SYSTEM WITH RESTRICTED NUMBER OF ADDRESS INDENTIFIERS IN DOMAIN AREAS FOR IDENTIFYING SERVER ADDRESSES

BACKGROUND OF THE INVENTION

1. Field of the Invention

The present invention relates to a website access technique of connecting a user terminal to a desired one of a large number of websites on a network.

2. Description of the Related Art

There have been provided various types of Internet-enabled mobile phones by plural carriers. A typical example is an i-mode service provided by NTT DoCoMo, Inc. in Japan. With an Internet-enabled phone such as an i-mode phone, a user can easily access and obtain convenient online services anywhere at any time, in addition to conventional voice communications. On the other hand, mobile phones are so-called keyboardless devices and therefore entering a URL (Uniform Resource Locator) is a time-consuming and frustrating experience. For example, when entering a letter "s", the user must press a key labeled "7" four times.

In general, entering URL is frustrating work, even if a keyboard-equipped computer is used, because the user must carefully enter the URL without making any typing mistakes. Although Bookmarks or Favorites functions can be used to register URLs and select a favorite one from the registered URLs, it is also frustrating to select one of a large number of registered URLs. Especially, in a mobile phone having a small display area installed therein, the inconvenience of searching for favorite URL becomes more pronounced.

In order to reduce such inconvenience, a system for accessing websites directly without having to type a long URL address, called Internet Numbers, has been provided by Internet Number Corporation (see http://www.hatch.co.jp/). According to Internet Numbers, its user can be connected to the homepage of a desired website by simply inputting an easy-to-remember and easy-to-input number which corresponds to the URL of the homepage.

However, the number of digits necessary for representing an increasing number of websites is increasing more and more. This is contradictory to an "easy-to-remember" and "easy-to-input" number which corresponds to the URL of a requested homepage.

SUMMARY OF THE INVENTION

An object of the present invention is to provide a website access method and system allowing easy operation and a small number of steps for accessing a desired one of a great number of websites.

According to an aspect of the present invention, a system includes: a plurality of domain areas, that is determined so that a number of information providing media is restricted, wherein each of the domain areas is each of which is a geographic area covered by at least one base station to allow a user terminal located in the domain area to connect to a network; an address registration database for retrievably registering a plurality of address identifiers uniquely identifying respective ones of server addresses which have been registered for each of the domain areas; and an access manager causing the user terminal to access a desired server on the network such that, when receiving an address identifier from the user terminal located in one of the domain areas, the access manager searches the address registration database for a corresponding server address according to the address identifier and the domain area where the user terminal is located, and then uses the corresponding server address to make the user terminal access the desired server on the network.

Each of the domain areas may be a communication area formed by a single base station, wherein the domain area where the user terminal is location is determined by identification of a base station that communicates directly with the user terminal.

The system may further include; a locations identifying device for identifying a location of the user terminal, wherein the domain areas are formed by dividing a system service area covered by all base stations, wherein the domain area where the user terminal is location is determined based on an identified location of the user terminal.

The domain areas may be defined by each of a plurality of carriers and the user terminal is operable in domains areas defined by the carriers, wherein the address registration database retrievably registering the plurality of address identifiers uniquely identifying respective ones of server addresses which have been registered for each of the domain areas defined by each of the carriers, and the access manager causes the user terminal to access the desired server on the network such that, when receiving the address identifier from the user terminal located in one of the domain areas defined by a carrier, the access manager searches the address registration database for a corresponding server address according to the address identifier, the domain area where the user terminal is located, and the carrier the user terminal is rising, and then the access manager uses the corresponding server address to make the user terminal access the desired server on the network.

According to another aspect of the present invention, a method for registering an address identifier uniquely identifying a server address in an address registration database that is used to allow a user terminal to access to a server identified by the server address on a network, includes the steps of: a) providing a plurality of domain areas, that is determined so that a number of information providing media is restricted, wherein each of the domain areas is each of which is a geographic area covered by at least one base station to allow the user terminal located in the domain area to connect to the network; b) receiving a request for registering a new server address in a domain area from the user terminal; c) searching the address registration database for an available address identifier that is not used in the domain area; and d) registering the available address identifier uniquely identifying the new server address of the domain area in the address registration database.

As described above, according to the present invention, the address registration database retrievably registers a plurality of address identifiers uniquely identifying respective ones of server addresses which have been registered for each of a plurality of domain areas. Accordingly, the number of address identifiers assigned to each domain area can be reduced even when a great number of websites exist on the network. Because of a small number of address identifiers assigned to each domain area, the number of digits of an address identifier is also small, allowing easy operation of accessing a desired website.

Further, an ad distributor can automatically obtain an address identifier from the access server, resulting in efficient access service and effective advertising.

BRIEF DESCRIPTION OF THE DRAWINGS

FIG. 1A is a schematic diagram showing a website access system according to a first embodiment of the present invention;

FIG. 1B is a diagram showing an example of information providing media;

FIG. 14 is a flowchart showing an ID registration operation of the website access system according to the third embodiment.

DESCRIPTION OF THE PREFERRED EMBODIMENTS

First Embodiment 1.1) System Structure

Figure 2:
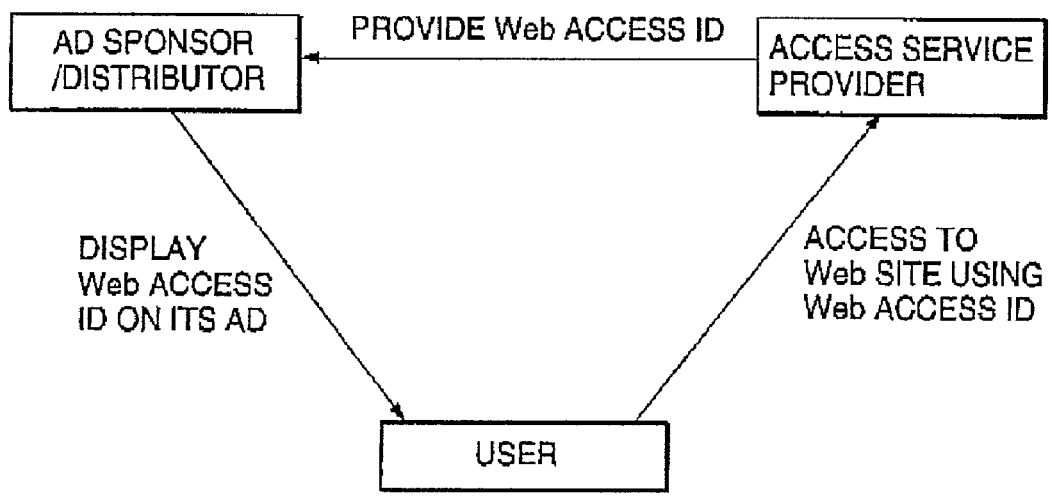
FIG. 2 is a schematic diagram showing a relationship among an ad sponsor, an access service provider, and a user in the first embodiment.

Referring to FIG. 1A, it is assumed for simplicity that an access management server 10 is connected to an address registration database 20 and is further connected to a mobile communications system, in which a user terminal 30 such as an Internet-enabled mobile phone located in a domain area 60 can be connected to the access management server 10 through a nearby radio base station 50 that is located in the domain area 60.

The access management server 10 controls access of the user terminal 30 to a designated website. The address registration database 20 retrievably registers identifiers corresponding to respective ones of websites (hereafter, called web access IDs). Since each web access ID uniquely identifies the URL address of a website, access to a selected website can be made by the user entering a corresponding web access ID through the user terminal 30. According to the present invention, a web access ID can be formed by a small number of digits, resulting in easy operation of requesting access to a desired website.

As shown in FIG. 1B, the user can know web access IDs through various information providing media 40 such as ads for information related to the website. Accordingly, many users can easily access desired websites by entering corresponding web access IDs. For example, a user who is interested in Picasso's works enters only the displayed 3-digit web access ID "123" through the user terminal 30 to access the website that provides information regarding the Picasso's exhibition.

As shown in FIG. 2, an access service provider registers a web access ID corresponding to a web site of an ad sponsor or ad distributor in the address registration database 20 and then provides it to the ad sponsor/distributor. The ad sponsor displays the web access ID in its ad to inform many users through information providing media 40. When a user wants to see the content of one of the ads, the user enters the web access ID through the user terminal 30 to access the website. Accordingly, the desired content can be easily and rapidly displayed through the user terminal 30 without entering a long and complicated URL.

Figures 3, 4:
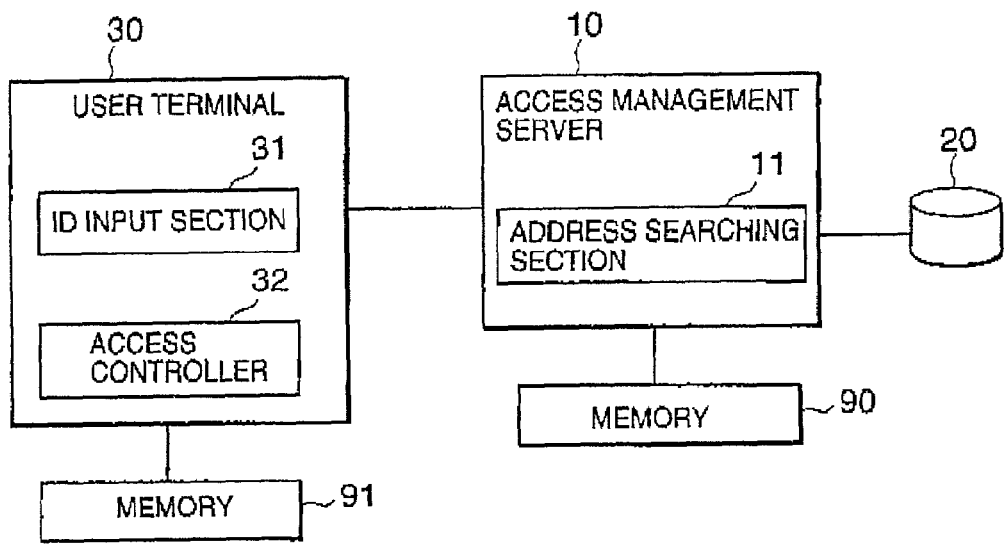
FIG. 3 is a block diagram showing a first example of the website access system according to the first embodiment.
FIG. 4 is a diagram showing an example of contents stored in an address registration database used in the first embodiment.

Referring to FIG. 3, the access management server 10 is a server computer that communicates with user terminals through the mobile communications system and also allows user terminals to be connected to desired websites. The access management server 10 is provided with an address searching section 11 that searches the address registration database 20 for the URL address of the website corresponding to a web access ID received from the user terminal 30. This causes the access management server 10 to accept the web access ID instead of URL address. The found URL address is used to make the user terminal 30 be connected to the desired web site. Necessary software programs for the function of the address searching section 11 are stored in a memory 90.

The user terminal 30 is an Internet-enabled communication terminal such as cellular phone or PHS (personal handy-phone system) terminal, or an Internet-enabled information terminal such as a personal computer or PDA (Personal Digital Assistant). The user terminal 30 may be a keyboard-equipped device or a so-called keyboardless device.

The user terminal 30 is provided with an ID input section 31 and an access controller 32. The ID input section 31 provides an input interface to enter a web access ID, that may be a ten-key a pad, a keyboard, a scanner such as a bar code reader, or wireless (radio or infrared) communication device. The ID input section 31 may be also a ten-key image on screen allowing input of a web access ID.

The access controller 32 is used to send an input web access ID to the access management server 10 and then display the web page of the URL address received from the access management server 10 on a web browser installed in the user terminal 30. Necessary software programs for the functions of the ID input section 31 and the access controller 32 are stored in a memory 91.

There may be two ways the user terminal 30 is connected to a desired web sites. The access management server 10 may be provided with a web server function for providing users with a web page through which a user can enter a web access ID. When a web access ID has been entered on the web page, the access management server 10 receives the web access ID through CGI (Common Gateway Interface) and searches the address registration database 20 for the URL address of the website corresponding to the received web access ID and then uses the found URL address to make the user terminal 30 be connected to the desired web site. In this way, the home page of the requested web site is displayed on a web browser installed in the user terminal 30. In this case, it is possible to provide the web browser with both functions of the ID input section 31 and the access controller 32.

Alternatively, it is possible to connect the user terminal 30 to a desired web site without providing users with a web page through which a user can enter a web access ID. In this case, the entered web accesses ID is transferred from the user terminal 30 to the access management server 10 and the found URL address is transferred from the access management server 10 back to the user terminal 30.

To communicate between the user terminal 30 and the access management server 10, various existing communication lines may be employed, for example, mobile communication line, wired telephone line, carrier communication line, CATV line, and other leased lines. When a wireless LAN base station, Bluetooth® base station, or IrDA (Infrared Data Association) base station is installed in an office, these wireless communications may be employed.

Further, it is not necessary Lo use the same line for the user terminal 30 to access the Internet and the access management server 10. For example, the user terminal 30 may access the Internet through telephone line or carrier communications network and access the access management server 10 through one of the above wireless communication systems.

Referring to FIG. 4, the address registration database 20 has a web access ID field and a URL address field. For example, web access ID "123" corresponds to URL address "http://www.x.corn/y/" and, when the web access ID "123" has been entered, the address registration database 20 sends the URL address "http://www.x.com/y/" back to the access management server 10. Similarly, when the web access ID "124" has been entered, the address registration database 20 sends the URL address "http://www.x.com/z/" back to the access management server 10.

The information providing media 40 are media providing the public with necessary information including web access IDs identifying websites related to the ads. For example, street ads using posters, oversize televisions, and/or sound may be employed. A website related to the ads is provided on the network by a sponsor or advertisement distributor and is used to perform web information distribution, charge settlement, electronic ticket distribution and the like. For example, a company can use its own website for advertisement of the company itself, an online-shopping site for product advertisement, or an online ticket sale site or a musician's home page for entertainment such as a concert.

A means for informing users of web access IDs is not restricted to displaying web access IDs on ad media such as posters. It is also possible to send web access ID data to user terminals by, for example, bar code, speech, radio, or Infrared. In this case, the ID input section 31 of the user terminal 30 is a bar code reader or scanner, a speech recognizer, a radio receiver, or an Infrared receiver. In the case where radio or infrared communication is used, radio or infrared communication devices are installed in both the information providing media 40 and the user terminal 30. In this system, web access ID data can be automatically obtained from the information providing media 40 without manually entering it. Accordingly, a long web access ID can be employed. Further, a long and complicated URL may be transferred from the information providing media 40 directly to the user terminal 30.

According to the first embodiment as shown in FIG. 1A, the domain area 60 is limited to a predetermined area in which access service can be obtained for only websites requested by ad sponsors/distributors or users. This causes the number of digits of a web access ID to be shortened. In this embodiment, only one domain area 60 is shown. The cases where a plurality of domain areas is set will be described later.

In FIG. 1A, the user terminal 30 is a mobile terminal but not restricted to such a keyboardless mobile device. A personal computer having a keyboard equipped therewith may be used as the user terminal 30.

1.2) Website Access Operation

In the above-described system structure, a website access operation of the first embodiment will be described with reference to FIG. 5.

Figure 5:
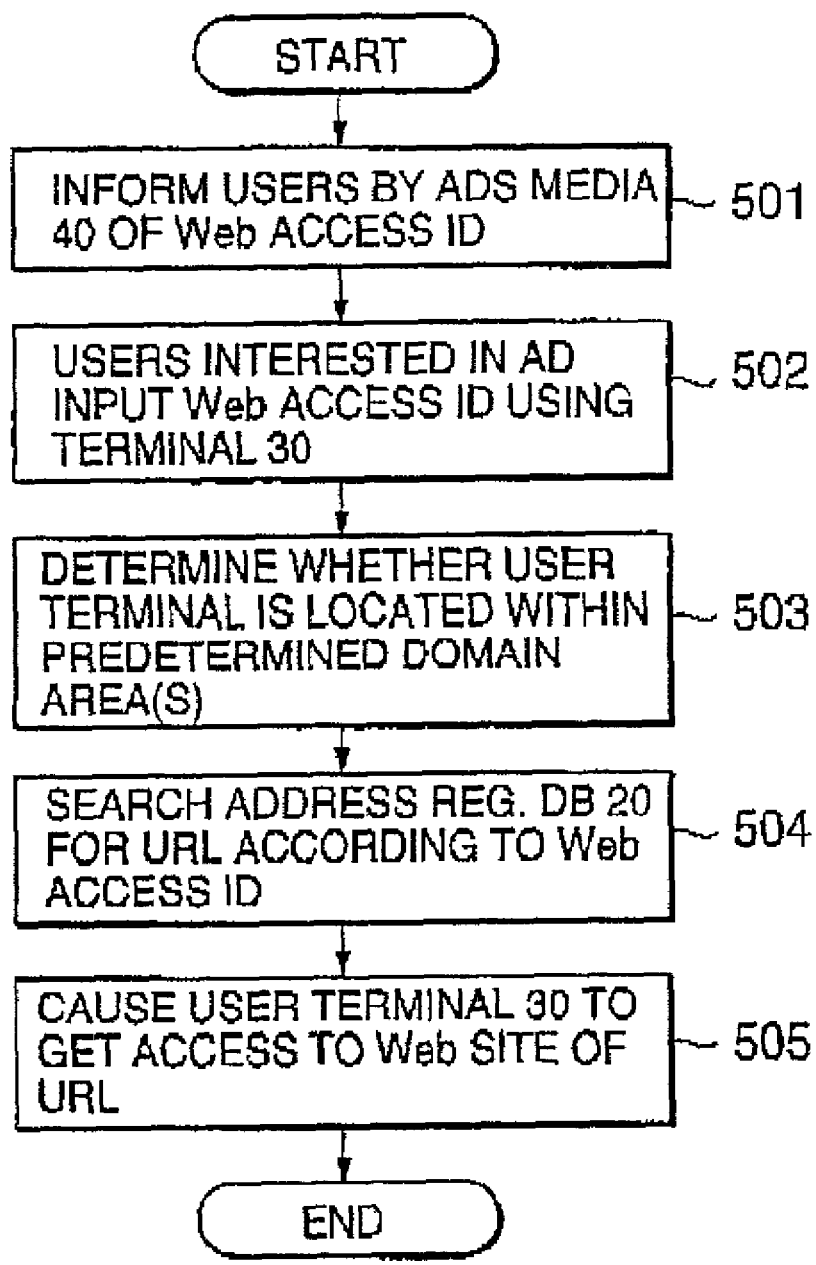
FIG. 5 is a flowchart showing a website access operation of the website access system according to the first embodiment.

Referring to FIG. 5, a user is informed by the information providing media 40 of a numeral web access ID of an ad distributor provided by the access service provider (step 501). As described before, the web access ID may be transferred using bar code, radio signal, Infrared signal, image or speech.

A user who is interested in the ad of the information providing media 40 enters the web access ID through the user terminal 30 (step 502). When receiving the web access ID, the access management server 10 determines whether the user terminal 30 is located within one or more domain area (step 503). When only one domain area 60 exists as shown in FIG. 1A, the access management server 10 just determines whether the user terminal 30 is located within the domain area 60. As described later, such an area determination process (step 503) may be performed at the side of the user terminal 30.

When it is determined that the user terminal 30 is located within the domain area, the access management server 10 searches the address registration database 20 for a corresponding URL address according to the received web access ID (step 504). Thereafter, the access management server 10 causes the user terminal 30 originating the web access ID to be connected to the URL address of the desired website (step 505). For example, the access management server 10 causes the user terminal 30 to switch a displayed home page to the home page of the connected web site. Alternatively, the access management server 10 sends the found URL address to the user terminal 30 and the access controller 32 of the user terminal 30 controls the web browser to access the home page of the received URL address.

1.3) Domain Area Determination

A first example of domain area determination is to set the domain area 60 to the area allowing wireless communications between a predetermined base station and the user terminal 30. In this case, the user terminal 30 can determine whether it is located in the cell formed by the predetermined base station. As the predetermined base station, a radio base station of an existing mobile telephone network, a wireless LAN, Bluetooth, or IrDA base station may be used.

Selecting one or more of these different base stations allows the size of a domain area to be adjusted such that the number of web access IDs falls within an appropriate range depending on the number of websites requested for access in each location. More specifically, these communication systems have different communication distances: 40 m for wireless LAN, 10 m for Bluetooth, and 20 cm to 1 m for IrDA. In the case of two-digit web access ID (100 IDs or less), the wireless LAN base station is used when several tens web access IDs are assigned to an area of 40 m radius, Bluetooth base station when several tens web access IDs are assigned to an area of 10 m radius, and IrDA bass station when may web access IDs are assigned to a narrower area.

As a second example, a locations identifying system such as GPS (Global Positioning System) may be used to accurately identify the location of the user terminal 30. It can be determined whether the identified location of the user terminal 30 is within the domain area 60 by referring to the latitude and longitude of the domain area 60.

The domain area determination may be performed not only by the access management server 10 but also by the user terminal 30. The user terminal 30 communicates with the base station or GPS satellites and thereby obtains information of the domain area 60. For example, the user terminal 30 performs the domain area determination process before sending the web access ID and the domain area determination result to the access management server 10.

1.4) Web Access ID Registration

An advertisement sponsor or distributor can automatically register a web access ID corresponding to a URL address in the access registration database 20 using its terminal through the network. It is assumed for simplicity that the ad sponsor or distributor uses a user terminal 30 of its own to communicate with the access management server 10 to register the web access ID.

Figure 6:
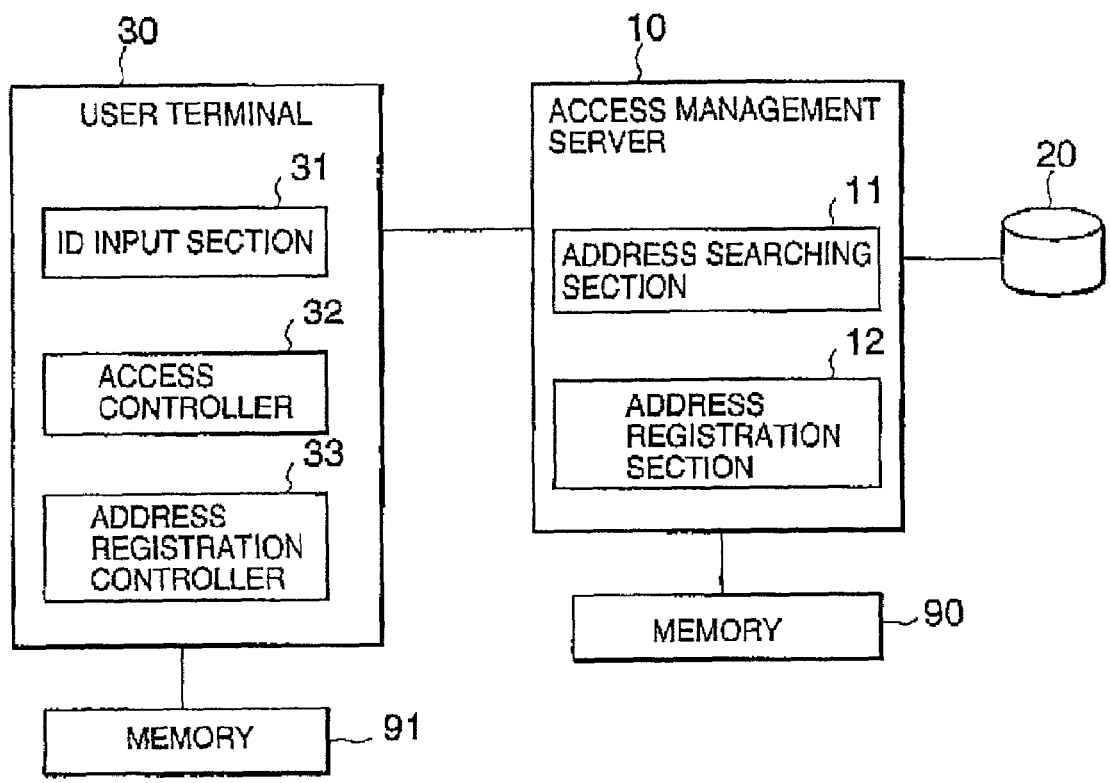
FIG. 6 is a block diagram showing a second example of a website access system according to the first embodiment.

FIG. 6 shows an access system having web access ID registration function. Blocks similar to those previously described with reference to FIG. 3 are denoted by the same reference numerals and the details will be omitted. The access management server 10 is provided with an address registration section 12 in addition to the address searching section 11. The user terminal 30 is provided with an address registration controller 33 in addition to the ID input section 31 and the access controller 32. The address registration controller 33 sends URL data of a website that is entered by the ad sponsor/distributor, to the access management server 10 and, when receiving a corresponding web access ID from the access management server 10, the address registration controller 33 sends it to the ad sponsor/distributor.

When the access management server 10 is provided with the web server function for providing users with a web page through which a user can enter a web access ID, the address registration controller 33 may be also implemented by the web browser installed in the user terminal 30 without adding a special function to the terminal 30.

Figure 7:
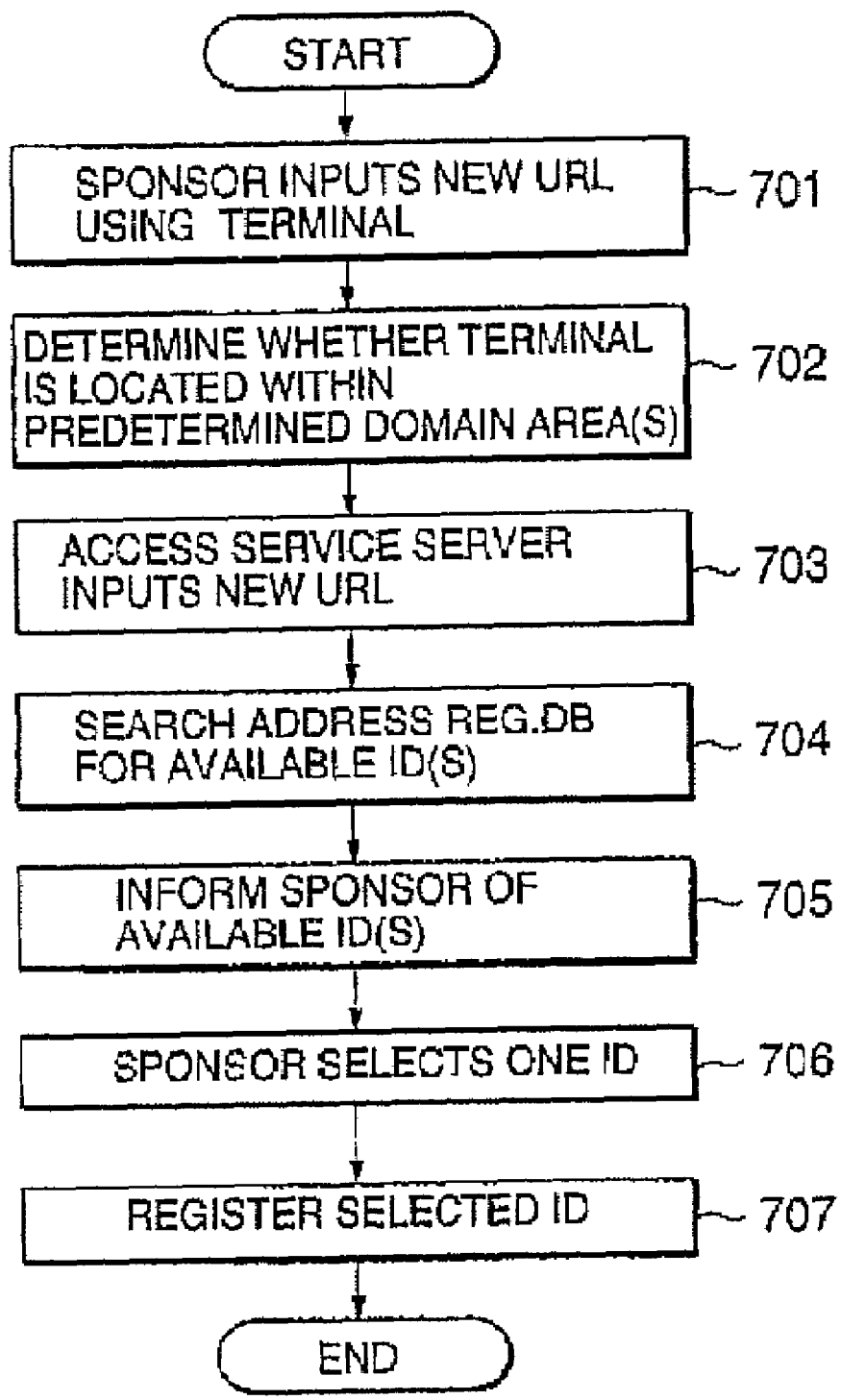
FIG. 7 is a flowchart showing an ID registration operation of the website access system according to the first embodiment.

Referring to FIG. 7, the ad sponsor/distributor enters a new URL address using the user terminal 30 (step 701). For example, the ad sponsor/distributor enters the URL address of the website used to perform web information distribution, charge settlement, electronic ticket distribution and the like related to the ad content.

Thereafter, the access management server 10 determines whether the area where the information providing media 40 can be seen or heard by users is located within a predetermined domain area including one or more domain-area (step 702). When only one domain area 60 exists as shown in FIG. 1A, it may be determined whether the user terminal 30 is located within the domain area 60.

When it is determined that the user terminal 30 is located within the predetermined domain area, the access management server 10 receives the new URL address (step 703) and starts searching the address registration database 20 for available web access IDs which can be assigned to the received new URL address (step 704).

An available web access ID may be automatically assigned to the new URL address. In the present embodiment, however, the access management server 10 sends a selected candidate for web access ID to the ad sponsor/distributor to obtain the consent of the ad sponsor/distributor or offers the ad sponsor/distributor a choice of candidates for web access ID.

More specifically, the access management server 10 informs the ad sponsor/distributor of the found available web access IDs (step 705). When the received available web access IDs have been displayed, the ad sponsor/distributor selects one of the available web access IDs through the user terminal 30 (step 706). When the access management server 10 is notified of the selected web access ID, the access management server 10 registers the selected web access ID corresponding to the new URL address in the address registration database 20 (step 707).

The user terminal 30 may be provided with a function of automatically displaying the registered web access ID corresponding to the new URL address in the information providing media 40. For example, the user terminal 30 may have a bar code printer function for printing a bar code indicating a web access ID and an automatic; registration function of automatically registering data indicating the web access ID into a transmitter installed in the information providing media 40.

In FIG. 7, the domain area determination step 702 can use various ways similar to those in the case of FIG. 5.

A first example of domain area determination step 707 is to set the domain area 60 to the area allowing wireless communications between a predetermined base station and the user terminal 30. In this case, the user terminal 30 can determine whether it is located in the cell formed by the predetermined base station, depending whether communication with the base station is possible. By the ad sponsor/distribution with the user terminal 30 moving in an area where the information providing media 40 can be seen or heard, it can be determined whether communication with the base station is possible. In this way, it is determined whether a user can obtain the access service of the access management server 10.

As a second example, a locations identifying system such as GPS (Global Positioning System) may be used to accurately identify the location of the user terminal 30. It can be determined whether the identified location of the user terminal 30 is within the domain area 60 by referring to the latitude and longitude of the domain area 60. In this case, By the ad sponsor/distributor with the user terminal 30 moving while identifying the locations of the user terminal 30 in an area where the information providing media 40 can be seen or heard, it can be determined whether a user can obtain the access service of the access management server 10.

As a third example, it is possible to compare the domain area 60 to the area where the information providing media 40 can be seen or heard on a map. When a new website is created, each domain area shown on the map and place names in the domain area are displayed to be checked by the ad sponsor/distributor.

An access system running company may operate the system by billing the ad sponsor/distributor for web access ID registration service or collecting advertisement fee for banner ad displayed on websites users may visit. It is also considered that Internet service provider or telephone company provides users of its services with information services at no charge.

As described above, users can easily access a desired website by only entering a short web access ID. In other words, the ad sponsor/distributor can gain an increased number of user's accesses more efficiently, compared with a conventional ad method using a long URL address. When the user terminal 30 receives the web access ID from the information providing media 40, the user can further easily access the website without entering numerals.

For the access service provider, the access service can be automatically provided to users without any manual operations. Further, the web access ID can be automatically obtained from the access management server via the network.

In addition, within a predetermined domain area, web access IDs are individually assigned to respective ones of URL addresses and therefore the total number of web access IDs permitted in the predetermined domain area can be substantially reduced. By selecting one or more of base stations having different communication distances, such as wireless LAN, Bluetooth, and IrDA, the size of a domain area can be changed so as to set the number of digits of a web access ID to a predetermined value or less. In the case of 3-digit web access IDs, the user can access a desired one of websites associated with the domain area by only performing five key pressing operations: the mode switch key, three keys for the web access ID, and the enter key.

Second Embodiment 2.1) System Structure

Figure 8:
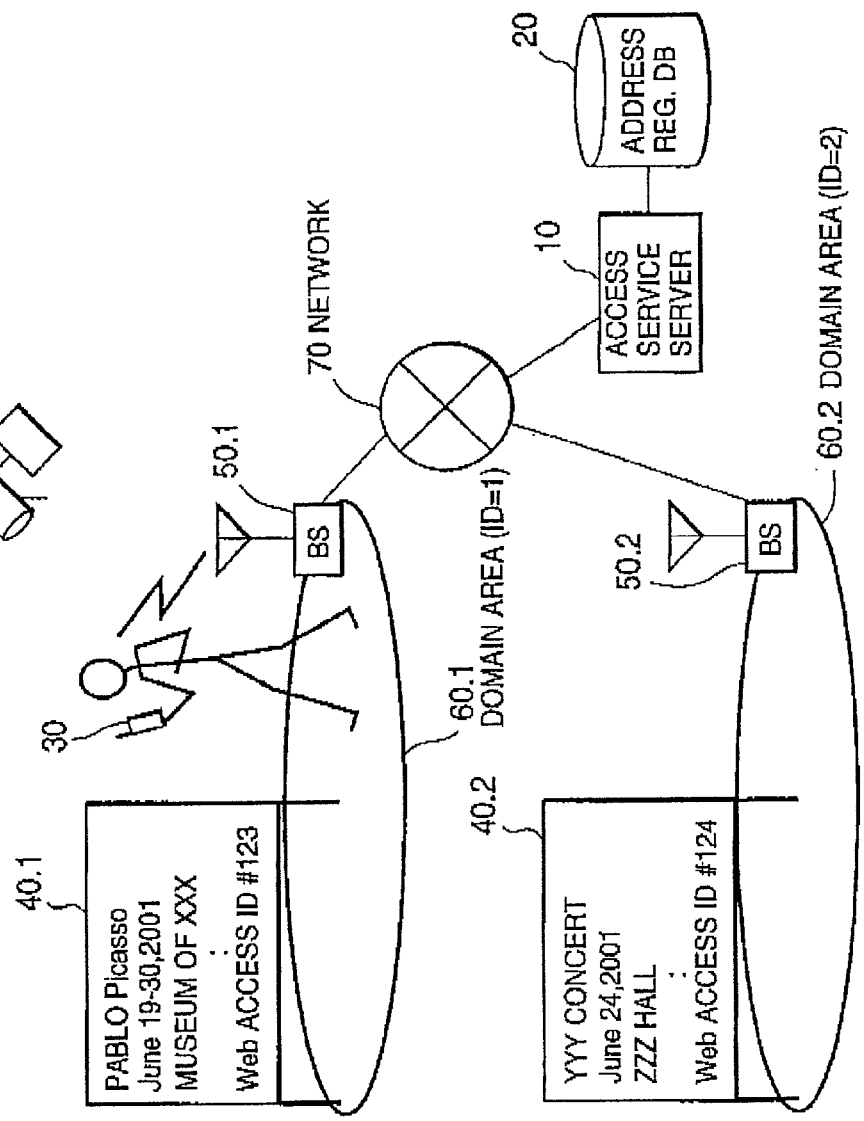
FIG. 8 is a schematic diagram showing a website access system according to a second embodiment of the present invention.

FIG. 8 shows an example of an access system according to a second embodiment of the present invention, wherein blocks similar to those previously described with reference to FIG. 1A are denoted by the same reference numerals.

In the second embodiment, a plurality of domain areas are provided and each of the domain areas has a unique domain ID and a limited number of web access IDs assigned thereto. Here, it is assumed for simplicity that two domain areas 60.1 and 60.2 are provided within a system service area, have domain ID=1 and ID=2 assigned thereto, and have base stations 50.1 and 50.2 installed therein, respectively. It is further assumed that a first information providing media 40.1 can be seen or heard in the domain area 60.1 and a second information providing media 40.2 can be seen or heard in the domain area 60.2.

In this system, an access management server 10 is connected to an address registration database 20 and is further connected to a network 70 such as a mobile communications network. A user terminal 30 such as an Internet-enabled mobile phone is assumed to be located in a domain area 60.1 and can be connected to the access management server 10 through a nearby radio base station 50.1 and the network 70.

The network 70 can employ various existing communication networks. For example, a wired LAN may be employed in the case of the base station being a wireless LAN base station, a carrier communication network or Internet in the case of the base station being a carrier base station. When the base station is Bluetooth® base station or IrDA base station, it is possible to connect the user terminal 30 to the access service server 10 through LAN or directly to the access service server 10.

A locations identifying system 60 such as GPS (Global Positioning System) may be used to accurately identify the location of the user terminal 30 to notify the identified location to the user terminal 30 and/or the access service server 10. It can be determined which domain area the identified location of the user terminal 30 falls into by referring to the latitude and longitude of each domain area. It is also possible to implement the locations identifying system 80 in a user terminal or a base station.

The access management server 10 controls access of the user terminal 30 to a designated website based on the web access ID received from the user terminal 30 and the identified location of the user terminal 30.

Figure 9:
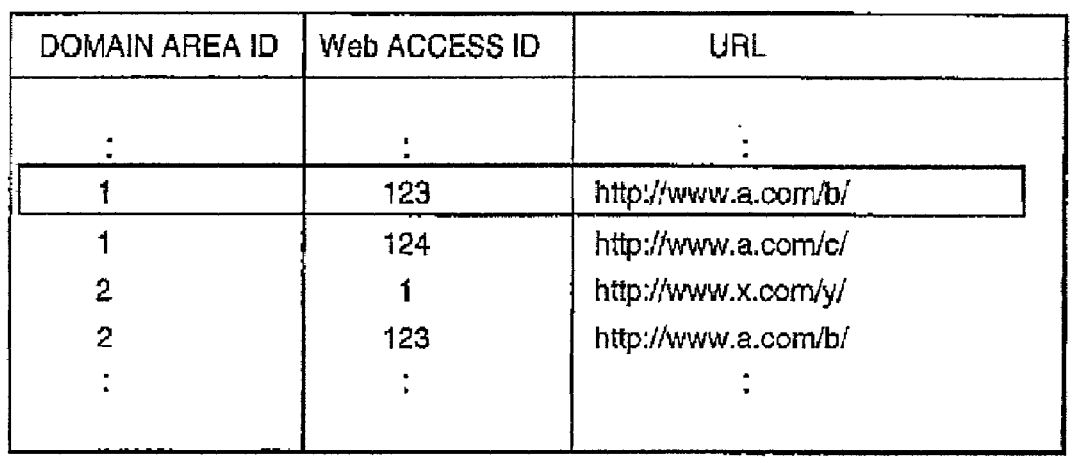
FIG. 9 is a diagram showing an example of contents stored in an address registration database used in the second embodiment.

As shown in FIG. 9, the address registration database 20 has a domain area ID field, a web access ID field, and a URL address field. For example, a pair of domain area ID "1" and web access ID "123" uniquely identifies URL address "http://www.a.com/b/" and, when the web access ID "123" has been entered and the domain area ID "1" has been determined, the address registration database 20 sends the URL address "http://www.a.com/b/" back to the access management server 10. It is convenient for searching to use a set of numerals or symbols as the domain area ID and web access ID, compared with characters of place name and site name.

It should be noted that the same web access ID cannot be assigned to different URL addresses for the same domain area (60.1, 60.2). However, there are cases whore an information providing media 40 can be seen or heard indifferent domain areas. Accordingly, it is possible to register the same URL address for a plurality of domain areas using a common web access ID or different web access IDs used in the respective domain areas.

2.2) Website Access Operation

In the above-described system structure, a website access operation of the second embodiment will be described with reference to FIG. 5. The steps 501 and 502 are the same as the case of the first embodiment as described before.

In the domain area determination step 503, the domain area ID of a domain area in which the user terminal 30 is located is determined. The domain area ID can be obtained by using a base station or the locations identifying system 80.

In the case of using a base station, the radio zone (cell) of a base station where the user terminal 30 is located is used as a domain area. In this case, the ID of the base station can be used as the domain area ID. Accordingly, the ID of the base station accommodating the user terminal 30 is transferred as the domain area 10 to the access management server 10.

In the case of using the locations identifying system 80, each domain area is previously determined by dividing a service area into a plurality of areas based on the latitude and longitude data, each of which has a predetermined size and has a domain area ID assigned thereto. It can be determined which one of the domain areas the identified location of the user terminal 30 is located. Accordingly, the domain area ID can be easily obtained.

When receiving the domain area ID of the location of the user terminal 30 and the web access ID from the user terminal 30, the access management server 10 searches the address registration database 20 for a corresponding URL address according to a pair of the domain area ID and the received web access ID (step 504). Thereafter, the access management server 10 causes the user terminal 30 originating the web access ID to be connected to the URL address of the desired website (step 505).

2.3) Web Access ID Registration

Figure 10:
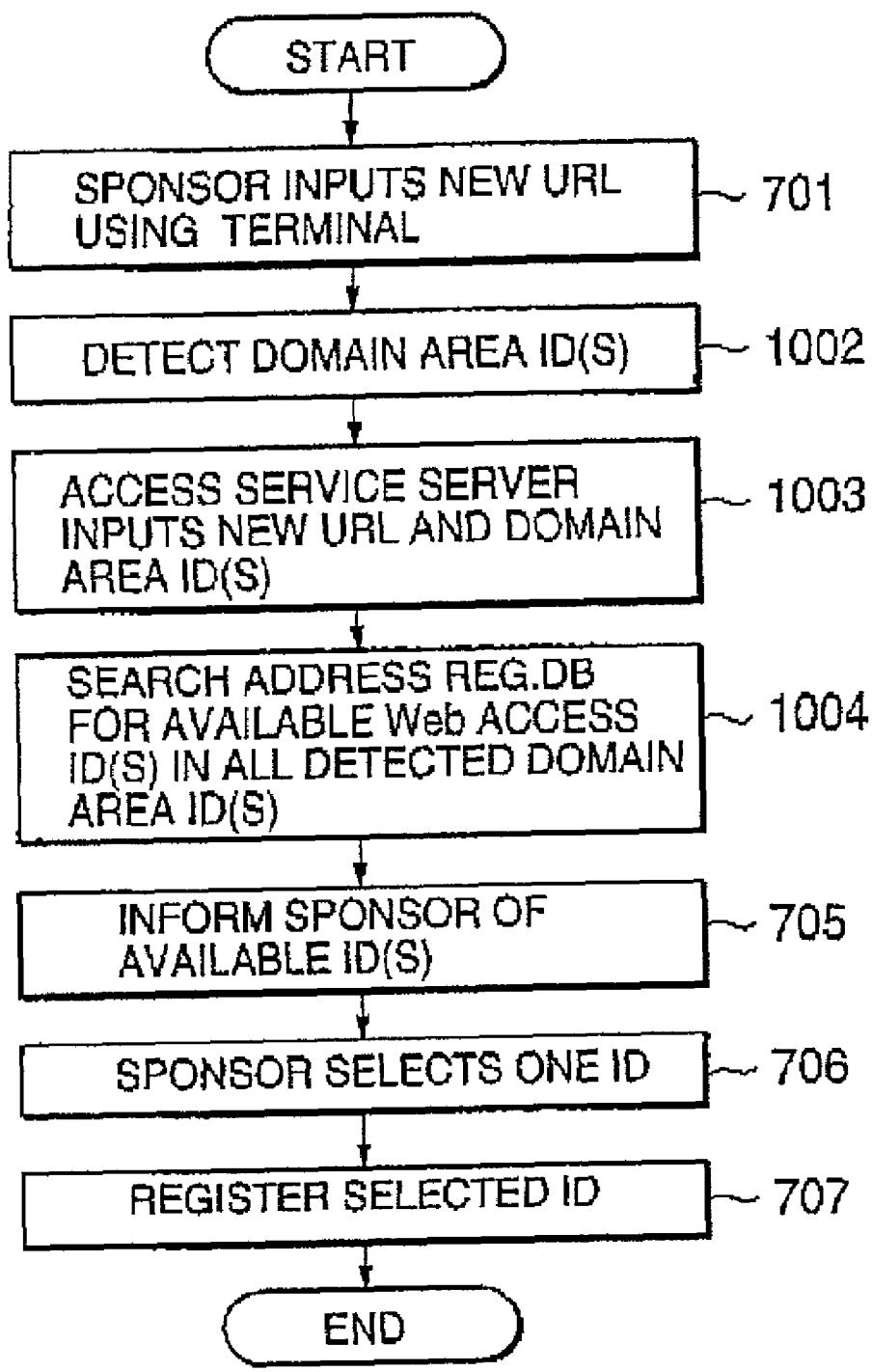
FIG. 10 is a flowchart showing an ID registration operation of the website access system according to the second embodiment.

Referring to FIG. 10, an ad sponsor/distributor enters a new URL address using the user terminal 30 (step 701). For example, the ad sponsor/distributor enters the URL address of the website used to perform web information distribution, charge settlement, electronic ticket distribution and the like related to the ad content.

Thereafter, it is determined which one or more of the domain areas the information providing media 40 can be seen or heard from and obtains the domain area IDs assigned to the detected domain areas (step 1002). As described before, the domain area determination can be made by the ad sponsor/distributor with the user terminal 30 moving while identifying the locations of the user terminal 30 in an area where the information providing media 40 can be seen or heard. The domain area ID of an entire area where the information providing media 40 can be seen or heard may be registered manually. In the case where a new website is registered, the access management server 10 registers the URL address of the new website and one or more domain area ID automatically determined or designated by the ad sponsor/distributor (step 1003).

Thereafter, the access management server 10 starts searching the address registration database 20 for one or more available web access ID which is not assigned to any URL address for each of the detected domain areas (step 1004).

An available web access ID may be automatically assigned to the new URL address. In the present embodiment, however, the access management server 10 sends a selected candidate for web access ID to the ad sponsor/distributor to obtain the consent of the ad sponsor/distributor or offers the ad sponsor/distributor a choice of candidates for web access ID.

More specifically, the access management server 10 informs the ad sponsor/distributor of the found available web access IDs (step 705), when the received available web access IDs have been displayed, the ad sponsor/distributor selects one of the available web access IDs through the user terminal 30 (step 706). When the access management server 10 is notified of the selected web access ID, the access management server 10 registers the selected web access ID corresponding to the new URL address in the address registration database 20 (step 707). The selected web access ID is registered in all the detected domain areas.

According to the second embodiment, even when the access system operates over a plurality of domain areas, the ad sponsor/distributor can easily obtain and register a web access ID corresponding to a view URL address.

Third Embodiment 3.1) System Structure

In an access system according to a third embodiment of the present invention, a user can efficiently obtain access service in the case where a user terminal 30 can be operable in a plurality of carriers in a local service area. It is assumed for simplicity that a cell A.m1 of carrier A overlaps with cells B.n1, B.n2, and B.n3 of carrier B as shown in FIG. 11.

Figure 12:
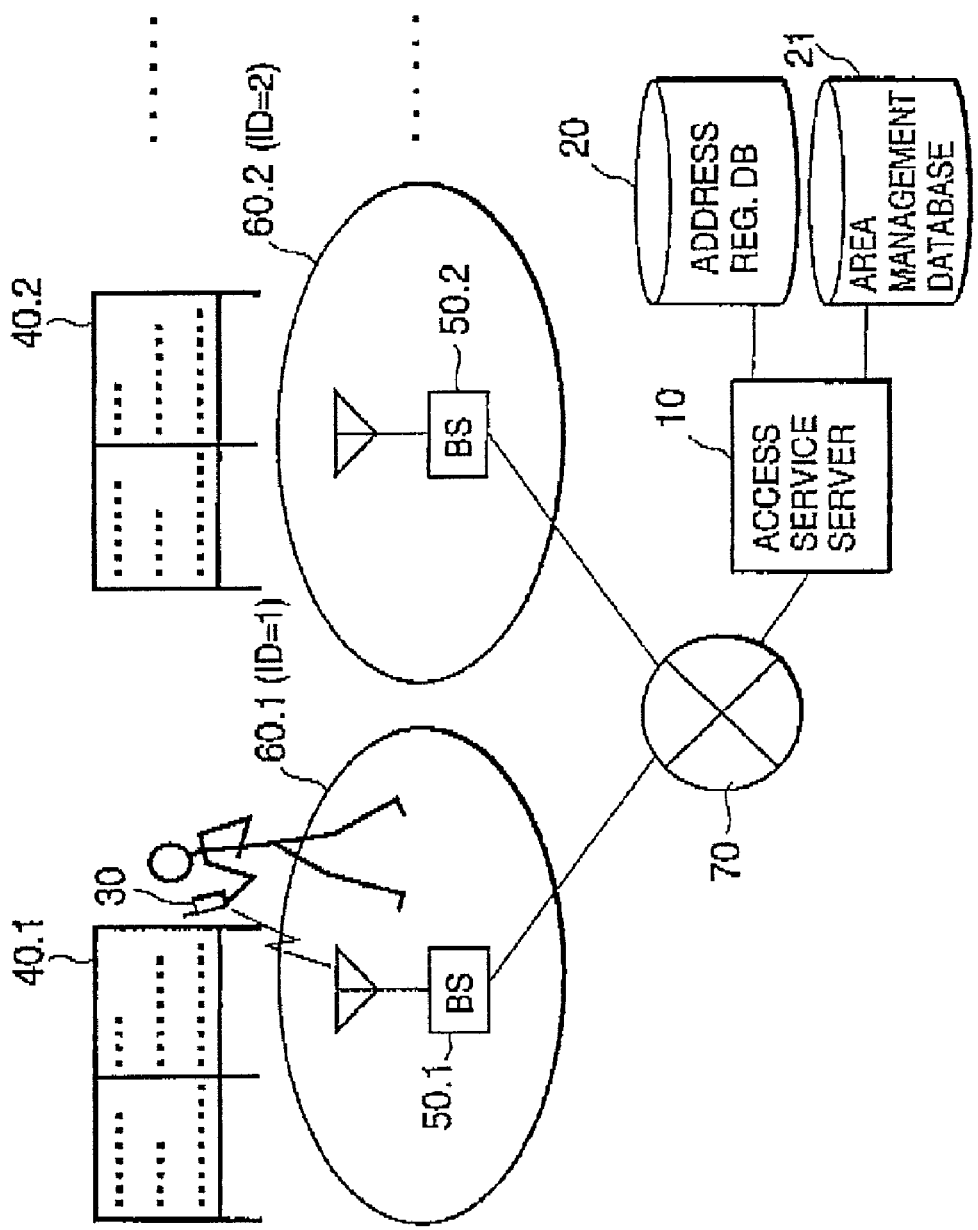
FIG. 12 is a schematic diagram showing a website access system according to the third embodiment of the present invention.

FIG. 12 shows an example of an access system according to the third embodiment of the present invention, wherein blocks similar to those previously described with reference to FIG. 8 are denoted by the same reference numerals and the details will be omitted.

Figure 11:
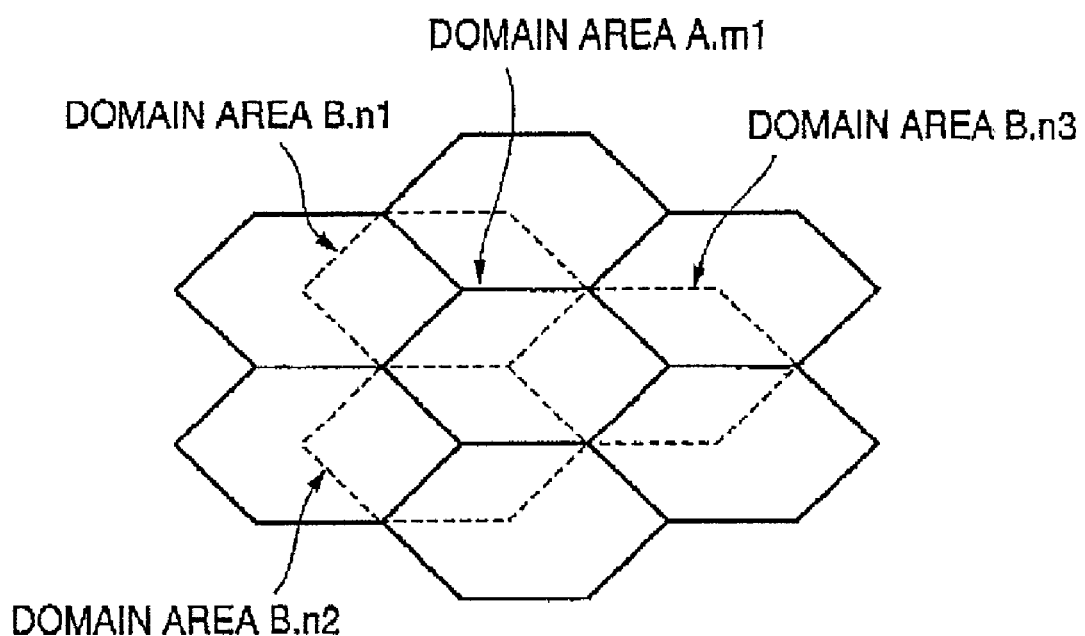
FIG. 11 is a diagram showing an example of domain area allocation according to a third embodiment of the present invention.

The third embodiment is different from the second embodiment in that a plurality of domain areas overlaps as shown in FIG. 11 and an area management database 21 is provided which is connected to the access management server 10. According to the third embodiment, the domain areas can be determined for each carrier.

The access management server 10 is connected to an address registration database 20 and the area management database 21 and is further connected to the network 70 such as a mobile communications network. A user terminal 30 is assumed to be located in a domain area 60.1 and can be connected to the access management server 10 through a nearby radio base station 50.1 and the network 70.

The access management server 10 controls access of the user terminal 30 to a designated website using the address registration database 20 and the area management database 21 based on the web access ID received from the user terminal 30, the identified location of the user terminal 30, and the carrier ID identifying a carrier to which the user terminal 30 is now connected.

Figure 13:
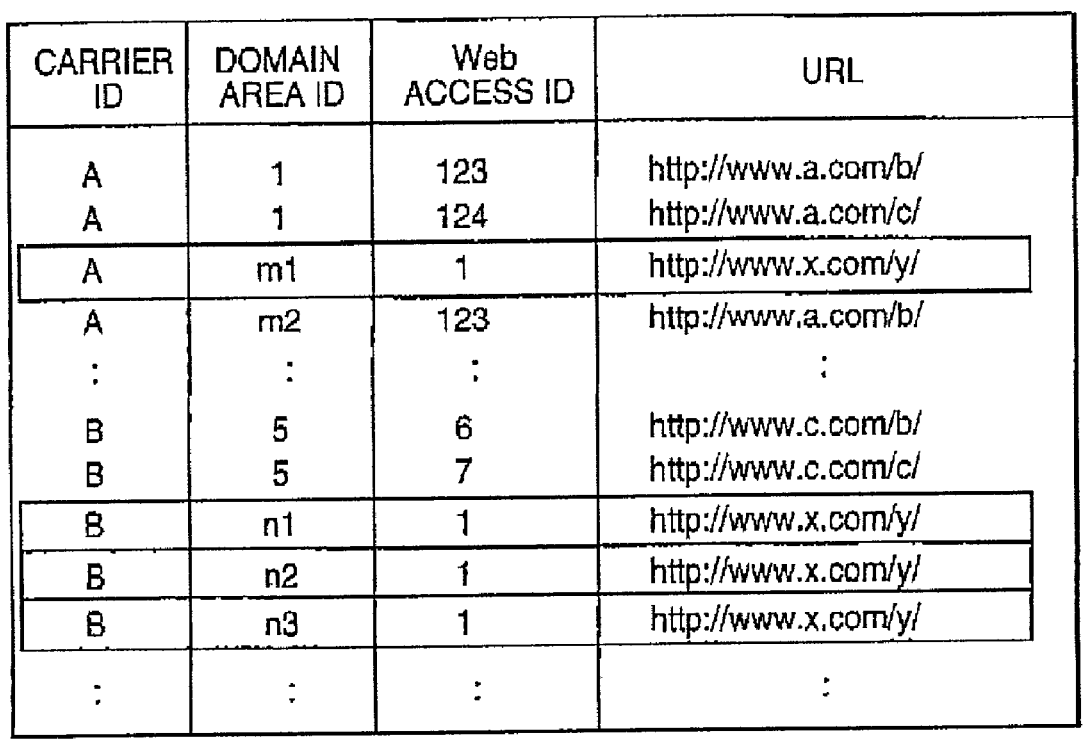
FIG. 13 is a diagram showing an example of contents stored in an address registration database used in the third embodiment.

As shown in FIG. 13, the address registration database 20 has a carrier ID field, a domain area ID field, a web access ID field, and a URL address field. For example, a combination of carrier ID "A", domain area ID "m1" and web access ID "1" uniquely identifies URL address "http://www.x.com/y/" and, when the web access ID "1" has been entered, the carrier ID "A" and the domain area ID "1" have been determined, the address registration database 20 sends the URL address "http://www.x.com/y/" back to the access management server 10.

It should be noted that the same web access ID cannot be assigned to different URL addresses for the same domain area. However, there are cases where an information providing media 40 can be seen or heard in different domain areas. Accordingly, it is possible to register the same URL address for a plurality of domain areas using a common web access ID or different web access IDs used in the respective domain areas.

Referring to FIG. 14, the area management database 21 registers area information of overlapping areas for each carrier. In this example, the carrier A has domain area IDs 1, 2, . . . , m1, . . . and the carrier B has domain area IDs 1, 2, . . . , n1, n2, n3, . . . . For example, as shown in FIG. 11, the domain area A.m1 having ID=m1 assigned thereto is adjacent to and overlaps with domain areas B.n1, B.n2, B.n3 of the carrier B. The domain area B.n1 having ID=n1 assigned thereto is adjacent to and overlaps with the domain area A.m1. It is the same with the domain areas B.n2 and B.n3. Accordingly, when a domain area is designated, the domain areas overlapping with the designated domain area can be obtained by searching the area management database 21. The area management database 21 is not restricted to a relational database as shown in FIG. 14. Another type of database such as object-oriented database may be used.

3.2) Website Access Operation

In the above-described system structure, a website access operation of the second third embodiment will be described with reference to FIG. 5. The steps 501 and 502 are the same as the case of the first embodiment as described before.

In the domain area determination step 503, the domain area ID of a domain area in which the user terminal 30 is located is determined. The domain area ID can be obtained by using a base station or the locations identifying system 80. In addition, it is necessary to previously obtain the carrier ID identifying a system through which the domain area ID has been obtained. For example, the carrier ID identifies a communication system such as mobile telephone, wireless IAN, Bluetooth, or IrDA and a locations identifying system 80 such as GPS.

When receiving the carrier ID, the domain area ID associated with the location of the user terminal 30, and the web access ID, the access management server 10 searches the address registration database 20 for a corresponding URL address according to a combination of the carrier ID, the domain area ID and the received web access ID (step 504). Thereafter, the access management server 10 causes the user terminal 30 originating the web access ID to be connected to the URL address of the desired website (step 505).

In this manner, a user terminal operable in a plurality of carriers can obtain website access service as in the case of the second embodiment.

3.3) Web Access ID Registration

Figure 15:
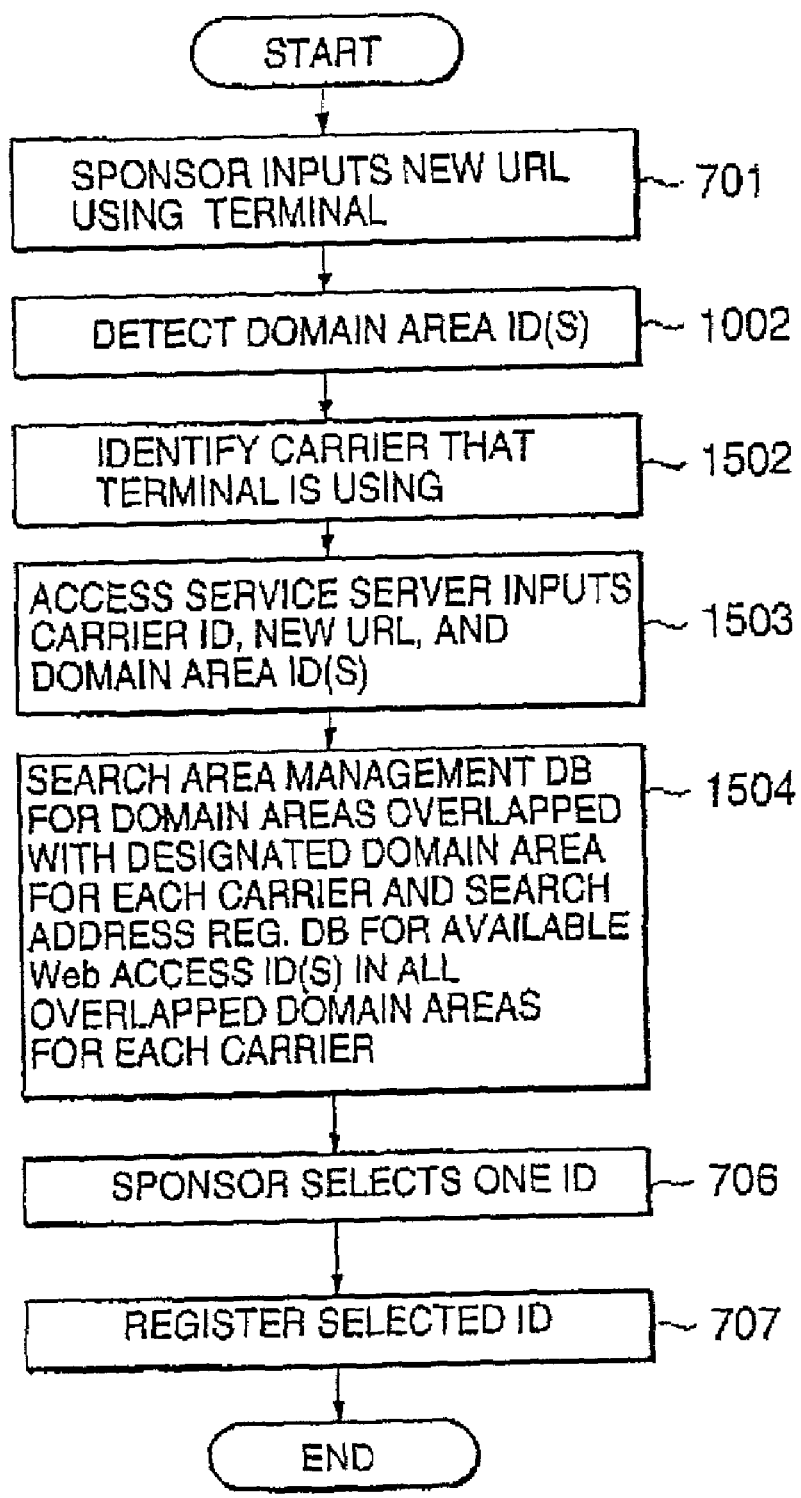
FIG. 15 is a diagram showing an example of contents stored in an area management database used in the third embodiment.

Referring to FIG. 15, an ad sponsor/distributor enters a new URL address using the user terminal 30 (step 701). For example, the ad sponsor/distributor enters the URL address of the website used to perform web information distribution, charge settlement, electronic ticket distribution and the like related to the ad content.

Thereafter, it is determined which one or more of the domain areas the information providing media 40 can be seen or heard and obtains the domain area IDs assigned to the detected domain areas (step 1002). As described before, the domain area determination can be made by the ad sponsor/distributor with the user terminal 30 moving while identifying the locations of the user terminal 30 in an area where the information providing media 40 can be seen or heard. The domain area ID of an entire area where the information providing media 40 can be seen or heard may be registered manually.

Thereafter, it is determined which carrier the user terminal 30 is using (step 1502). When receiving the carrier ID, the domain area ID, and the URL address (step 1503), the access management server 10 performs assignment of a web access ID to the URL address (steps 1504). More specifically, the access management server 10 searches the area management database 21 to obtain overlapping domain area information for each carrier. Thereafter, the access management server 10 searches the address registration database 20 for one or more available web access ID which is not assigned to any URL address for each of the overlapping domain areas.

An available web access ID may be automatically assigned to the new URL address. In the present embodiment, however, the access management server 10 sends a selected candidate for web access ID to the ad sponsor/distributor to obtain the consent of the ad sponsor/distributor or offers the ad sponsor/distributor a choice of candidates for web access ID.

More specifically, the access management server 10 informs the ad sponsor/distributor of the found available web access IDs (step 705). When the received available web access IDs have been displayed, the ad sponsor/distributor selects one of the available web access IDs through the user terminal 30 (step 706). When the access management server 10 is notified of the selected web access ID, the access management server 10 registers the selected web access ID corresponding to the new URL address in the address registration database 20 (step 707). The selected web access ID is registered in all the detected domain areas.

According to the third embodiment, even when the access system operates over a plurality of domain areas and a plurality of different carriers, the ad sponsor/distributor can easily obtain and register a web access ID corresponding to a new URL address.

In the above first to third embodiments, the necessary functions of the access management server 10 such as the address searching section 11 may be implemented with hardware. Alternatively, these functions may be implemented by running computer programs loaded in a memory on a computer. These computer programs may be stored in the memory 90 such as a magnetic disk, semiconductor memory, or the like. Similarly, the necessary functions of the user terminal 30 such as the ID input section 31 and the access controller 32 may be implemented with hardware. Alternatively, these functions may be implemented by running computer programs loaded in a memory on a computer. These computer programs may be stored in the memory 91 such as a magnetic disk, semiconductor memory, or the like.

The above computer programs may be provided to a user in the form of a recording medium or by the user downloading them from the access management server 10 to the user terminal 30 or personal computer through the network 70. Recently, many information devices and communication devices including personal computers, notebook computers or PDAs have been provided with data communication function, web browser, and other information processing functions. Therefore, by downloading necessary computer programs, the user terminal 30 according to the present invention can be set up.

The invention claimed is:

1. A system comprising:
    an address registration database for registering a plurality of address identifiers in response to requests for address identifiers from a plurality of sponsor entities, each address identifier of the plurality of address identifiers being valid in a corresponding domain area of a plurality of domain areas, each domain area of the plurality of domain areas defining a geographic area in which a number of valid address identifiers is restricted, each address identifier of the plurality of address identifiers being unique in the corresponding domain area and identifying a single corresponding URL of a single corresponding website of a corresponding sponsor entity of said plurality of sponsor entities; and
    an access manager for receiving an address identifier of the plurality of address identifiers from a user terminal that is located in a domain area of the plurality of domain areas, and for searching the address registration database for a corresponding desired URL according to the address identifier and the domain area in which the user terminal is located, and for using the desired URL to cause the user terminal to access a desired website that is specified by the desired URL;
    wherein the user terminal is a mobile communication terminal;
    wherein the address registration database is configured such that it is able to register a first address identifier of the plurality of address identifiers as being valid in a first domain area of the plurality of domain areas and as identifying a first URL, and is configured such that it is able to register a second address identifier of the plurality of address identifiers as being valid in a second domain area of the plurality of domain areas and as identifying a second URL, said second address identifier being the same as said first address identifier, said second URL being different from said first URL;
    wherein the user terminal and the access manager are configured such that, when the user terminal is located in the first domain area and sends the first address identifier to the access manager, the access manager causes the user terminal to access a first website that is specified by the first URL; and
    wherein the user terminal and the access manager are configured such that, when the user terminal is located in the second domain area and sends the second address identifier to the access manager, the access manager causes the user terminal to access a second website that is specified by the second URL.

2. The system according to claim 1, wherein each domain area of the plurality of domain areas is a communication area formed by a single base station, and
wherein the domain area in which the user terminal is located is determined by identification of a base station that communicates directly with the user terminal.

3. The system according to claim 2, wherein each base station for each of the plurality of domain areas is a selected one of a plurality of types of base stations having different communication distances so that the number of valid address identifiers in each of the plurality of domain areas is limited to within a predetermined range.

4. The system according to claim 1, further comprising:
a locations identifying device for identifying a location of the user terminal,
wherein the plurality of domain areas are formed by dividing a system service area covered by a plurality of base stations, and
wherein the domain area in which the user terminal is located is determined based on an identified location of the user terminal.

5. The system according to claim 1, wherein the plurality of domain areas are defined by each of a plurality of carriers, and the user terminal is operable in domain areas of the plurality of domain areas that are defined by the carriers,
wherein domain areas of the plurality of domain areas that are defined by different carriers of the plurality of carriers may overlap in geographical areas with each other,
wherein the address registration database registers the plurality of address identifiers identifying corresponding URLs for each of the domain areas defined by each of the carriers, and
wherein the access manager causes the user terminal to access the desired website on the network such that, when receiving the address identifier from the user terminal located in the domain area defined by a carrier, the access manager searches the address registration database for the corresponding desired URL according to the address identifier, the domain area in which the user terminal is located, and the carrier that the user terminal is using, and then the access manager uses the corresponding desired URL to make the user terminal access the desired website.

6. A system comprising:
an address registration database for registering a plurality of address identifiers in response to requests for address identifiers from a plurality of sponsor entities, each address identifier of the plurality of address identifiers being valid in a corresponding domain area of a plurality of domain areas, each domain area of the plurality of domain areas defining a geographic area in which a number of valid address identifiers is restricted, each address identifier of the plurality of address identifiers being unique in the corresponding domain area and identifying a single corresponding URL of a single corresponding website of a corresponding sponsor entity of said plurality of sponsor entities; and
an access manager for receiving an address identifier of the plurality of address identifiers from a user terminal that is located in a domain area of the plurality of domain areas, and for searching the address registration database for a corresponding desired URL according to the address identifier and the domain area in which the user terminal is located, and for using the desired URL to cause the user terminal to access a desired website that is specified by the desired URL;
wherein, when receiving a request for registering a new URL associated with a particular domain area from the user terminal, the access manager searches the address registration database for an available address identifier that is not used in the particular domain area and registers the available address identifier uniquely identifying the new URL of the particular domain area in the address registration database.

7. The system according to claim 6, wherein the plurality of domain areas are defined by each of a plurality of carriers, and the user terminal is operable in domain areas of the plurality of domain areas that are defined by the carriers,
wherein the request includes a designated carrier, and the access manager searches the address registration database for a specific available address identifier that is not used in the particular domain area of the designated carrier, and registers the specific available address identifier uniquely identifying the new URL of the particular domain area of the designated carrier in the address registration database.

8. The system according to claim 7, further comprising:
an area management database for retrievably registering overlapping domain areas defined by the carriers,
wherein the access manager searches the address registration database and the area management database to find a particular available address identifier that is not used in any domain areas of the designated carrier and a carrier overlapping with the designated carrier, and registers the particular available address identifier uniquely identifying the new URL of the particular domain area of the designated carrier in the address registration database.

9. The system according to claim 7, wherein the designated carrier is a carrier used for the user terminal to send the request.

10. The system according to claim 8, wherein the designated carrier is a carrier used for the user terminal to send the request.

11. The system according to claim 6, wherein the particular domain area is an area where the user terminal sends the request to the access manager.

12. The system according to claim 1,
wherein an information providing medium is installed in at least one of the plurality of domain areas for informing users of a particular address identifier of the plurality of address identifiers that has been registered in the address registration database.

13. The system according to claim 12, wherein the information providing medium uses alphanumeric characters to inform users of the particular address identifier that has been registered in the address registration database.

14. The system according to claim 12, wherein the information providing medium informs users by sound of the particular address identifier that has been registered in the address registration database.

15. The system according to claim 14, wherein the user terminal comprises a speech recognizer for recognizing the sound outputted from the information providing medium to produce the particular address identifier.

16. The system according to claim 12, wherein the information providing medium informs users by bar code of the particular address identifier that has been registered in the address registration database.

17. The system according to claim 16, wherein the user terminal comprises a bar code reader for reading the bar code displayed in the information providing medium to produce the particular address identifier.

18. The system according to claim 12, wherein the information providing medium transmits a radio signal conveying the particular address identifier that has been registered in the address registration database.

19. The system according to claim 18, wherein the user terminal comprises a radio receiver for receiving the radio signal from the information providing medium to produce the particular address identifier.

20. The system according to claim 1, wherein the desired website is on a network, and
wherein the network is the Internet and the desired URL is a URL address of the website on the Internet.

21. An access service providing method for providing a user terminal with access service of accessing a desired website on a network, comprising the steps of:
a) providing a plurality of domain areas, each of the plurality of domain areas defining a geographic area in which a number of valid address identifiers is restricted, each of the plurality of domain areas being covered by at least one base station to allow the user terminal to connect to the network;
b) registering a plurality of address identifiers in an address registration database in response to requests for address identifiers from a plurality of sponsor entities, each of the plurality of address identifiers being unique and valid in a corresponding domain area of the plurality of domain areas and identifying a single corresponding URL of a single corresponding website of a corresponding sponsor entity of said plurality of sponsor entities;
c) determining, when receiving an address identifier of the plurality of address identifiers from the user terminal, a domain area of the plurality of domain areas in which the user terminal is located;
d) searching the address registration database for a desired URL according to the address identifier and the domain area where the user terminal is located; and
e) causing the user terminal to access the desired website on the network using the desired URL;
wherein the user terminal is a mobile communication terminal;
wherein a first address identifier of the plurality of address identifiers that is valid in a first domain area of the plurality of domain areas and that identifies a first URL is the same as a second address identifier of the plurality of address identifiers that is valid in a second domain area of the plurality of domain areas and that identifies a second URL, said first URL different from said second URL;
wherein, when the user terminal is located in the first domain area and sends the first address identifier, the user terminal is caused to access a first website that is specified by the first URL; and
wherein, when the user terminal is located in the second domain area and sends the second address identifier, the user terminal is caused to access a second website that is specified by the second URL.

22. The method according to claim 21, wherein each of the plurality of domain areas is a communication area formed by a single base station, and
wherein the domain area where the user terminal is located is determined by identification of a base station that communicates directly with the user terminal.

23. The method according to claim 21, wherein the plurality of domain areas are defined by each of a plurality of carriers, and the user terminal is operable in domain areas of the plurality of domain areas defined by the carriers,
wherein the step b) is a step of registering the plurality of address identifiers identifying corresponding URLs which have been registered for each of the domain areas defined by each of the carriers,
wherein the step c) is a step of determining the domain area defined by a carrier when receiving the address identifier from the user terminal, and
wherein the step d) is a step of searching the address registration database for a desired URL according to the address identifier, the domain area where the user terminal is located, and the carrier that the user terminal is using.

24. A method for registering an address identifier uniquely identifying a URL in an address registration database that is used to allow a user terminal to access a website identified by the URL on a network, comprising the steps of:
a) providing a plurality of domain areas, each of the plurality of domain areas defining a geographic area in which a number of valid address identifiers is restricted, each of the plurality of domain areas being covered by at least one base station to allow the user terminal to connect to the network;
b) receiving a request for registering a new URL for a domain area from a sponsor entity of a plurality of sponsor entities, said new URL identifying a single corresponding particular website of the sponsor entity;
c) searching the address registration database for an available address identifier that is not used in the domain area; and
d) registering the available address identifier uniquely identifying the new URL of the domain area in the address registration database.

25. The method according to claim 24, wherein the plurality of domain areas are defined by each of a plurality of carriers and the user terminal is operable in domain areas of the plurality of domain areas defined by the carriers, wherein the request includes a designated carrier,
wherein the step c) is a step of searching the address registration database for an available address identifier that is not used in the domain area of the designated carrier, and
wherein the step d) is a step of registering the available address identifier uniquely identifying the new URL of the domain area of the designated carrier in the address registration database.

26. The method according to claim 25, further comprising the step of:
retrievably registering overlapping domain areas defined by the carriers in an area management database,
wherein:
the step c) is a step of searching the address registration database and the area management database to find an available address identifier that is not used in any of domain areas of the designated carrier and a carrier overlapping with the designated carrier, and
the step d) is a step of registering the available address identifier uniquely identifying the new URL of the domain area of the designated carrier in the address registration database.

27. The method according to claim 23, wherein the designated carrier is a carrier used for the user terminal to send the request.

28. The method according to claim 25, wherein the designated carrier is a carrier used for the user terminal to send the request.

29. The method according to claim 21, wherein the network is the Internet and the desired URL is a URL address of the desired website on the Internet.

30. The method according to claim 24, wherein the network is the Internet and the URL is a URL address of the website on the Internet.

31. A mobile terminal having a function of accessing a desired website of a sponsor entity on a network through an access server, comprising:
 a transceiver operable in each of a plurality of domain areas, each of the plurality of domain areas defining a geographic area in which a number of valid address identifiers is restricted, each of the plurality of domain areas being covered by at least one base station to allow the mobile terminal to connect to the network;
 an address identifier receiver for receiving address identifier data related to an address identifier of a plurality of address identifiers from an information providing medium, wherein the address identifier is uniquely associated, for a domain area of the plurality of domain areas, with a single corresponding URL of the desired website of the sponsor entity; and
 a controller for sending the address identifier to the access server to access the desired website of the sponsor entity;
 wherein the access server is configured to store a first address identifier of the plurality of address identifiers that is valid in a first domain area of the plurality of domain areas and that identifies a first URL, and is configured to store a second address identifier of the plurality of address identifiers that is valid in a second domain area of the plurality of domain areas and that identifies a second URL, said second address identifier being the same as said first address identifier, said second URL being different from said first URL:
 wherein the mobile terminal and the access server are configured such that, when the mobile terminal is located in the first domain area and sends the first address identifier to the access server, the access server causes the mobile terminal to access a first website that is specified by the first URL; and
 wherein the mobile terminal and the access server are configured such that, when the mobile terminal is located in the second domain area and sends the second address identifier to the access server, the access server causes the mobile terminal to access a second website that is specified by the second URL.

32. The mobile terminal according to claim 31, wherein the address identifier receiver is a speech recognizer for recognizing sound outputted from the information providing medium to produce the address identifier.

33. The mobile terminal according to claim 31, wherein the address identifier receiver is a bar code reader for reading a bar code displayed in the information providing medium to produce the address identifier.

34. The mobile terminal according to claim 31, wherein the address identifier receiver is a radio receiver for receiving a radio signal from the information providing medium to produce the address identifier.

35. An access service providing method for providing a user terminal with access service of accessing a website provided by an advertisement distributor, comprising the steps of:
 providing a plurality of domain areas, each of the plurality of domain areas defining a geographic area in which a number of valid address identifiers is restricted, each of the plurality of domain areas being covered by at least one base station to allow the user terminal to connect to the website;
 providing the advertisement distributor with an address identifier of a plurality of address identifiers that uniquely identifies the website, wherein the advertisement distributor informs the user terminal located in a domain area of the plurality of domain areas of the address identifier;
 finding, when receiving the address identifier from the user terminal, the website according to the address identifier and the domain area in which the user terminal is located; and
 causing the user terminal to access the website;
 wherein the user terminal is a mobile communication terminal;
 wherein a first address identifier of the plurality of address identifiers that is valid in a first domain area of the plurality of domain areas and that identifies a first URL is the same as a second address identifier of the plurality of address identifiers that is valid in a second domain area of the plurality of domain areas and that identifies a second URL, said first URL different from said second URL;
 wherein, when the user terminal is located in the first domain area and sends the first address identifier, the user terminal is caused to access a first website that is specified by the first URL; and
 wherein, when the user terminal is located in the second domain area and sends the second address identifier, the user terminal is caused to access a second website that is specified by the second URL.

36. A storage medium storing a computer program for instructing a computer to execute a process to provide a user terminal with access service of accessing a desired website on a network, the process comprising the steps of:
 a) providing a plurality of domain areas, each of the plurality of domain areas defining a geographic area in which a number of valid address identifiers is restricted, each of the plurality of domain areas being covered by at least one base station to allow the user terminal to connect to the network;
 b) registering a plurality of address identifiers in an address registration database in response to requests for address identifiers from a plurality of sponsor entities, each of the plurality of address identifiers being unique and valid in a corresponding domain area of the plurality of domain areas and identifying a single corresponding URL of a single corresponding website of a corresponding sponsor entity of said plurality of sponsor entities;
 c) determining, when receiving an address identifier from the user terminal, a domain area of the plurality of domain areas in which the user terminal is located;
 d) searching the address registration database for a desired URL according to the address identifier and the domain area in which the user terminal is located; and
 e) causing the user terminal to access the desired website on the network using the desired URL;
 wherein the user terminal is a mobile communication terminal;
 wherein a first address identifier of the plurality of address identifiers that is valid in a first domain area of the plurality of domain areas and that identifies a first URL is the same as a second address identifier of the plurality of address identifiers that is valid in a second domain area of the plurality of domain areas and that identifies a second URL, said first URL different from said second URL;

wherein, when the user terminal is located in the first domain area and sends the first address identifier, the user terminal is caused to access a first website that is specified by the first URL; and wherein, when the user terminal is located in the second domain area and sends the second address identifier, the user terminal is caused to access a second website that is specified by the second URL.

37. A storage medium storing a computer program for instructing a computer to execute a process to register an address identifier uniquely identifying a URL in an address registration database that is used to allow a user terminal to access a website identified by the URL on a network, the process comprising the steps of:

a) providing a plurality of domain areas, each of the plurality of domain areas defining a geographic area in which a number of valid address identifiers is restricted, each of the plurality of domain areas being covered by at least one base station to allow the user terminal to connect to the network;

b) receiving a request for registering a new URL for a domain area of the plurality of domain areas from a sponsor entity of a plurality of sponsor entities, said new URL identifying a single corresponding particular website of the sponsor entity;

c) searching the address registration database for an available address identifier that is not used in the domain area; and d) registering the available address identifier uniquely identifying the new URL of the domain area in the address registration database.

38. A recording medium storing a computer program for instructing a computer to execute a process to provide a user terminal with access service of accessing a desired website on a network, the process comprising the steps of:

a) providing a plurality of domain areas, each of the plurality of domain areas defining a geographic area in which a number of valid address identifiers is restricted, each of the plurality of domain areas being covered by at least one base station to allow the user terminal to connect to the network;

b) retrievably registering a plurality of address identifiers in an address registration database in response to requests for address identifiers from a plurality of sponsor entities, each of the address identifiers uniquely identifying a single corresponding URL of a single corresponding website of a corresponding sponsor entity of said plurality of sponsor entities;

c) determining, when receiving an address identifier from the user terminal, a domain area in which the user terminal is located;

d) searching the address registration database for a desired URL according to the address identifier and the domain area in which the user terminal is located; and e) causing the user terminal to access the desired website on the network using the desired URL;

wherein the user terminal is a mobile communication terminal;

wherein a first address identifier of the plurality of address identifiers that is valid in a first domain area of the plurality of domain areas and that identifies a first URL is the same as a second address identifier of the plurality of address identifiers that is valid in a second domain area of the plurality of domain areas and that identifies a second URL, said first URL different from said second URL;

wherein, when the user terminal is located in the first domain area and sends the first address identifier, the user terminal is caused to access a first website that is specified by the first URL; and wherein, when the user terminal is located in the second domain area and sends the second address identifier, the user terminal is caused to access a second website that is specified by the second URL.

39. A recording medium storing a computer program for instructing a computer to execute a process to register an address identifier uniquely identifying a URL in an address registration database that is used to allow a user terminal to access a website identified by the URL on a network, the process comprising the steps of:

a) providing a plurality of domain areas, each of the plurality of domain areas defining a geographic area in which a number of valid address identifiers is restricted, each of the plurality of domain areas being covered by at least one base station to allow the user terminal to connect to the network;

b) receiving a request for registering a new URL in a domain area from a sponsor entity of a plurality of sponsor entities, said new URL identifying a single corresponding particular website of the sponsor entity;

c) searching the address registration database for an available address identifier that is not used in the domain area; and d) registering the available address identifier uniquely identifying the new URL of the domain area in the address registration database.

40. A system, comprising:

an address registration database for registering a plurality of address identifiers, each address identifier of the plurality of address identifiers being valid for a corresponding carrier of a plurality of carriers in a corresponding domain area of a plurality of domain areas maintained by the corresponding carrier, each domain area of the plurality of domain areas of each of the plurality of carriers defining a geographic area in which a number of valid address identifiers is restricted, each address identifier of the plurality of address identifiers being unique for the corresponding carrier in the corresponding domain area and identifying a corresponding URL; and an access management server for receiving an address identifier of the plurality of address identifiers from a user terminal that is in communication with a carrier of the plurality of carriers and that is located in a domain area of the plurality of domain areas of the carrier, and for searching the address registration database for a corresponding desired URL according to the address identifier and the carrier that the user terminal is in communication with and the domain area in which the user terminal is located, and for using the desired URL to cause the user terminal to access a desired website that is specified by the desired URL;

wherein domain areas maintained by different carriers of said plurality of carriers may overlap in geographical areas.

* * * * *

UNITED STATES PATENT AND TRADEMARK OFFICE
CERTIFICATE OF CORRECTION

| | |
|---|---|
| PATENT NO. | : 7,093,014 B2 |
| APPLICATION NO. | : 09/945752 |
| DATED | : August 15, 2006 |
| INVENTOR(S) | : Yuichi Nino and Itaru Hosomi |

Page 1 of 1

It is certified that error appears in the above-identified patent and that said Letters Patent is hereby corrected as shown below:

<u>ON THE TITLE PAGE OF PATENT and at column 1, line 1</u>:

(54) Delete "ACCESS METHOD AND SYSTEM WITH RESTRICTED NUMBER OF ADDRESS INDENTIRFIERS IN DOMAIN AREAS FOR IDENTIFYING SERVER ADDRESSES" and replace it with --ACCESS METHOD AND SYSTEM WITH RESTRICTED NUMBER OF ADDRESS IDENTIFIERS IN DOMAIN AREAS FOR IDENTIFYING SERVE ADDRESSES--

Signed and Sealed this

Twelfth Day of December, 2006

JON W. DUDAS
*Director of the United States Patent and Trademark Office*